P. VAUGHN.
PIPE JOINT.
APPLICATION FILED MAR. 26, 1913.

1,201,116.

Patented Oct. 10, 1916.

Witnesses
W. S. McDowell
James Koehl

Inventor
Pink Vaughn
By Victor J. Evans
Attorney

UNITED STATES PATENT OFFICE.

PINK VAUGHN, OF EUSTACE, TEXAS, ASSIGNOR OF ONE-HALF TO THOMAS WILLIAM BLOUNT, JR., OF SAN AUGUSTINE, TEXAS.

PIPE-JOINT.

1,201,116.

Specification of Letters Patent.

Patented Oct. 10, 1916.

Application filed March 26, 1913. Serial No. 756,947.

*To all whom it may concern:*

Be it known that I, PINK VAUGHN, a citizen of the United States, residing at Eustace, in the county of Henderson and State of Texas, have invented new and useful Improvements in Pipe-Joints, of which the following is a specification.

The object of the invention is to provide in a watering tank for railroads an apparatus in which the conveying spout will be connected with a branch connection of the tank for universal movements whereby it can be readily extended to any desired position.

A still further object of the invention is to provide means for furnishing a perfect liquid tight joint at the point of swivel connection of the spout with the discharge connection of the tank.

Figure 2:
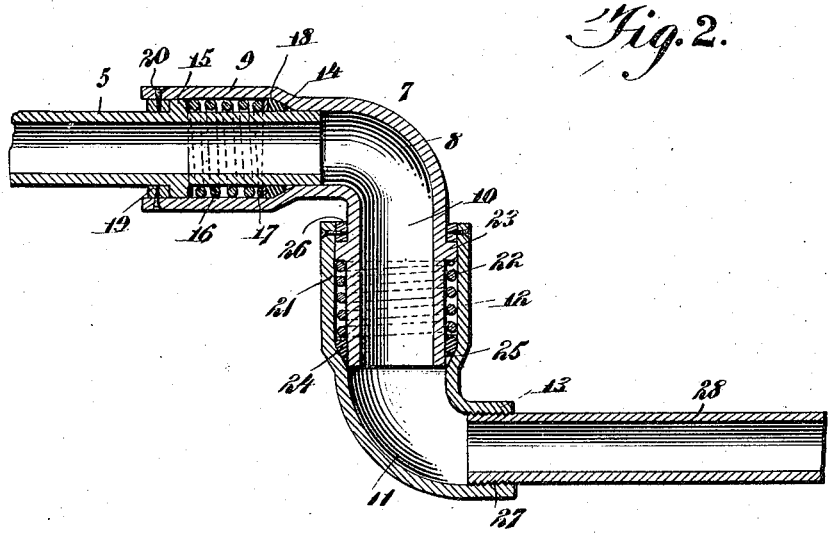
Figure 1:
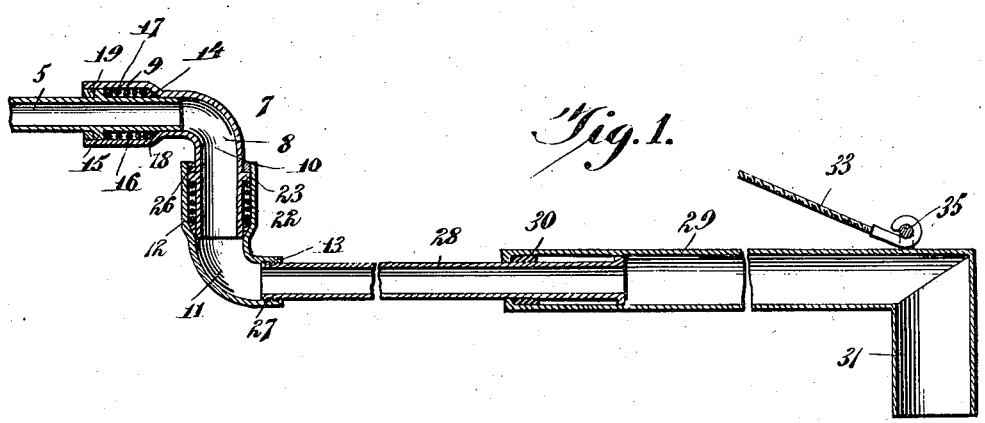

In the drawing forming a portion of this application and in which like letters of reference indicate similar parts in the several views: Figure 1 is a longitudinal section through the spout. Fig. 2 is a detail sectional view of the spout to be described.

From any suitable form of tank (not illustrated) there extends a branch pipe 5, the latter being suitably secured to the side of the tank as shown. The branch pipe 5 is connected to the branch 28 by universal joint or swivel 7 which includes an elbow 8 having a horizontal portion 9 and a depending portion 10 and a similar elbow 11 which includes a vertical portion 12 and a horizontal portion 13.

The horizontal portion 9 of the elbow 8 embraces the outer extremity of the branch pipe 5 of the tank, being disposed in spaced relation thereto and having its walls flared to present an angular seat 14 as shown. An integral collar 15 on the pipe 5 is embraced by the walls 9 of the elbow 8 and as shown a spring 16 which is confined in the space 17 between the walls 9 and the adjacent walls of the pipe 5 has one of its ends bearing against the collar 15 while its opposite end engages against a gasket or packing 18 which is exteriorly tapered for frictional engagement with the beveled seat 14 of the elbow whereby a liquid tight connection is formed at this point. From this construction it is evident that the elbow 8 is free to revolve upon the outer extremity of the pipe 5, the purpose of which to be explained hereinafter. With a view to preventing the accidental disconnection of the elbow 8 from the pipe 5 I provide within the walls 9 an annular stop collar 19, the same being secured to the walls by one or more set screws or equivalent detachable fastenings 20. The vertical depending portion 10 of the elbow 8 is restricted as compared with the previously described portion 9 of the elbow and as shown it extends into the large end 21 of the elbow 12. The said large end has its walls spaced from the adjacent walls of the depending portion 10 and mounted in the space and surrounding said portion 10 is a spring 22, one end of which being engaged against a fixed collar 23 of the portion 10 while its opposite end bears against a gasket or packing 24. This packing embraces the portion 10 and is slidable thereon and under the influence of the spring 22 it is yieldingly held against the annular seat 25 of the elbow 12. A collar 26 which is substantially identical with the collar 19 is secured within the walls of the portion 21 of the elbow and is designed to engage against the collar 23 as shown.

The restricted portion 13 of the elbow 12 is interiorly threaded to engage with the threaded end 27 of an inner section 28 of a telescopic water conducting spout. The outer section 29 of the spout has its inner portion provided with a yieldable gasket 30 which yieldingly engages against the section 28 in order that the liquid tight connection will be formed at the joint between the section. The outer end of the section 29 is provided with an angularly extending neck 31 to be extended into the reservoir in the tender of the locomotive in the usual manner.

Incident to the peculiar details of construction of the device described herein the spout may be extended angularly in either direction and laterally or it may be adjusted to the full line positions as the occasion may demand. In this manner the spout will be made to readily accommodate itself to the intake on the reservoir of the tender without demanding definitely positioning the locomotive with relation to the tank which has been found desirable in that an engineer does not always bring his engine to a standstill at the requisite distance from the tank to effect a proper water supply connection therewith.

I claim:—

In combination a fixed pipe, a branch pipe having an elbow surrounding said fixed pipe, a horizontal portion having a flaring shoulder joining said elbow whereby to be placed concentrically around said fixed pipe, and a depending portion formed integrally upon said elbow, a flange formed integrally upon said fixed pipe and snugly received in said horizontal portion, a circular member surrounding said fixed pipe bearing against said flange and secured to said horizontal portion, a wedging packing ring surrounding said fixed pipe, an expansible spring surrounding said pipe and bearing at one end against said ring and at its opposite end against said flange whereby to force said ring to point against said flaring shoulder, an integral flange formed upon said depending portion, a supported pipe consisting of an elbow, of a vertical portion having a flared shoulder joining said elbow, said last named vertical portion surrounding said last named flange a circular member surrounding said first named elbow engaging said last named flange and secured to the last mentioned horizontal portion, a wedging ring binding against the flaring shoulder of said last named horizontal portion, a spring surrounding said depending portion and engaging said last named packing ring, said supported pipe adapted to move toward said first named horizontal portion, and a delivery pipe connection secured in said last named elbow.

In testimony whereof I affix my signature in presence of two witnesses.

PINK VAUGHN.

Witnesses:
R. R. VAUGHT,
J. A. KNIGHT.